US010838579B2

(12) United States Patent
Blumenkron Hurtado et al.

(10) Patent No.: US 10,838,579 B2
(45) Date of Patent: Nov. 17, 2020

(54) CUSTOM LIST FOR KEYBOARD NAVIGATION OF USER INTERFACE

(71) Applicant: International Business Machines Corporation, Armonk, NY (US)

(72) Inventors: Alejandro A. Blumenkron Hurtado, Zapopan (MX); Jose R. Mosqueda Mejia, Puruandiro (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 438 days.

(21) Appl. No.: 14/863,831

(22) Filed: Sep. 24, 2015

(65) Prior Publication Data
US 2017/0090686 A1 Mar. 30, 2017

(51) Int. Cl.
*G06F 3/0482* (2013.01)
*G06F 3/0489* (2013.01)

(52) U.S. Cl.
CPC .......... *G06F 3/0482* (2013.01); *G06F 3/0489* (2013.01); *G06F 3/04892* (2013.01)

(58) Field of Classification Search
CPC ... G06F 3/0482; G06F 3/04892; G06F 3/0489
See application file for complete search history.

(56) References Cited

U.S. PATENT DOCUMENTS

| 7,263,662 B1* | 8/2007 | Ballard | G06F 3/023 707/999.102 |
| 7,636,897 B2 | 12/2009 | Koralski et al. | |
| 8,799,954 B1* | 8/2014 | Ellis | H04N 5/44543 725/46 |
| 9,727,549 B2* | 8/2017 | Chirca | G06F 17/243 |
| 2005/0015730 A1* | 1/2005 | Gunturi | G06F 9/4443 715/777 |
| 2005/0172237 A1* | 8/2005 | Cragun | G06F 9/4443 715/744 |
| 2010/0017742 A1* | 1/2010 | Rhodes | G06F 3/0482 715/780 |
| 2011/0296336 A1* | 12/2011 | Law | G06F 3/0483 715/777 |
| 2013/0111382 A1 | 5/2013 | Glaza et al. | |
| 2013/0332815 A1* | 12/2013 | Gallo | G09B 21/008 715/234 |

* cited by examiner

*Primary Examiner* — Amy Ng
*Assistant Examiner* — Sajeda Muhebbullah
(74) *Attorney, Agent, or Firm* — Cantor Colburn LLP; Alexander Jochym

(57) ABSTRACT

Embodiments relate to keyboard navigation of a user interface using a custom list. An aspect includes displaying, on a computer display device of a computer system, a user interface to a user, wherein the user interface is associated with a default list comprising all of the selectable elements in the user interface. Another aspect includes, based on determining that a custom list for the user interface exists, wherein the custom list comprises a subset of the selectable elements in the default list, performing keyboard navigation of the user interface according to the custom list. Yet another aspect includes, based on determining that no custom list for the user interface exists, performing keyboard navigation of the user interface according to the default list.

17 Claims, 4 Drawing Sheets

CUSTOM LIST FOR KEYBOARD NAVIGATION OF USER INTERFACE

BACKGROUND

The present invention relates generally to user interfaces in a computer system, and more specifically, to custom lists for keyboard navigation of a user interface.

As legislation such as the Americans with Disabilities Act (ADA) becomes widely applied to web pages and other computer user interfaces, accessibility to these user interfaces by persons having a different set of abilities becomes mandated by law. Online service providers and electronic businesses (e-businesses) need help in meeting these requirements and ensuring that they serve all their customers. As Web pages begin to differentiate themselves based on service, online businesses that offer service tailored to the customer's needs are more likely to be favored by customers with disabilities, or customers with a different set of abilities, than those Web pages that do not offer such tailored service. There are various assistive technologies, such as screen readers, that help people with disabilities navigate the elements of a user interface on a computer display. A disabled user may interact with a user interface using keyboard scrolling, e.g., use of the TAB or SHIFT-TAB keys on the computer keyboard, to step through the various selectable elements of a user interface.

SUMMARY

Embodiments include a method, system, and computer program product for keyboard navigation of a user interface using a custom list. An aspect includes displaying, on a computer display device of a computer system, a user interface to a user, wherein the user interface is associated with a default list comprising all of the selectable elements in the user interface. Another aspect includes, based on determining that a custom list for the user interface exists, wherein the custom list comprises a subset of the selectable elements in the default list, performing keyboard navigation of the user interface according to the custom list. Yet another aspect includes, based on determining that no custom list for the user interface exists, performing keyboard navigation of the user interface according to the default list.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of custom lists for keyboard navigation of a user interface are provided, with exemplary embodiments being discussed below in detail. A user with disabilities that is unable to use the mouse, may rely on keyboard navigation (for example, using the TAB or SHIFT-TAB keys) to move across selectable elements (for example, buttons or fillable text fields) on a computer user interface. A user interface may have a relatively large number of selectable elements, which may cause keyboard navigation using the default list of selectable elements of a user interface to be time consuming and annoying. Creation of a custom list comprising a subset of the selectable elements in a user interface may make keyboard navigation easier and faster for a user interface having a relatively large number of selectable elements. A custom list may also allow the user to navigate the elements in the custom list in a desired order. Custom list creation and navigation may be built into accessibility software that is part of the operating system of the computer. A user may create and save a plurality of custom lists for a plurality of user interfaces, and may further create a plurality of custom lists for a single user interface, e.g. application or web page. Each saved custom list is associated with a profile of the user. The user interface may be any appropriate user interface that is displayed on a computer display, and the elements in the custom list may be any appropriate selectable element. Creation of a custom list allows the user to avoid scrolling through elements in a user interface that are never or rarely used by the user, simplifying the keyboard navigation.

A custom list, as used herein, refers to an array of user interface elements or objects in a user interface which stores specific properties corresponding to each element. These object properties can be used to identify the element in the user interface, and further includes a custom list index number, indicating an order of the element in the custom list. A profile, as used herein, refers to the set of custom lists that are saved for a particular user. A profile may be created for each user logged into the operating system of a computer system, and each profile may have a list formed by the page/screen within an application and the associated custom list. Multiple custom lists may be defined for a single page or screen.

Figure 1:
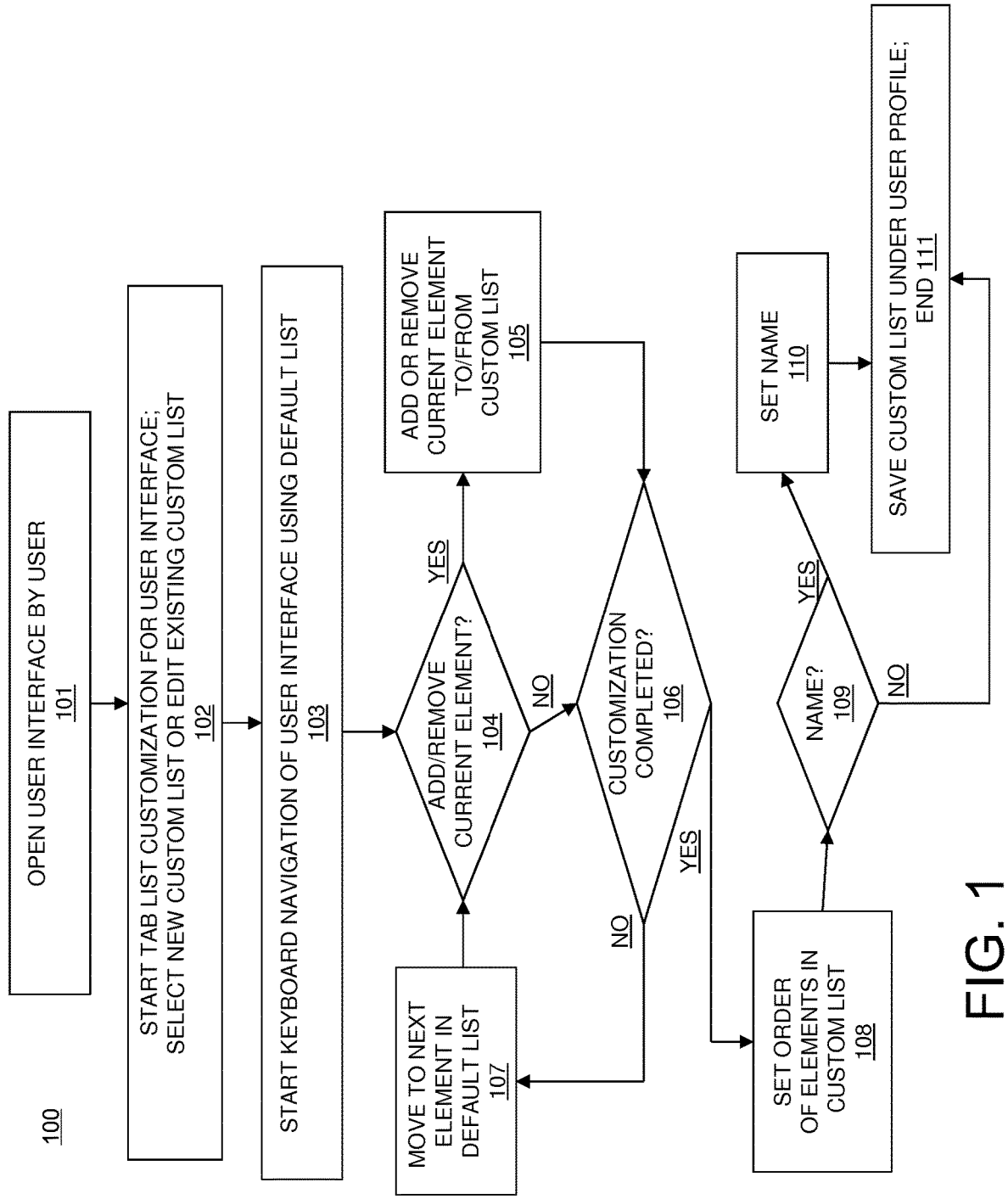
FIG. 1 depicts a flowchart of a method for creating or editing a custom lists for keyboard navigation of a user interface in accordance with an embodiment.

FIG. 1 illustrates an embodiment of a method 100 for creating or editing a custom list for keyboard navigation of a user interface. In block 101, a user opens a user interface on a display associated with a computer system. In block 102, the user notifies the custom list module of the computer system to start list customization. The user may select a saved custom list for the particular user interface to edit, or may create a new custom list for the user interface in block 102. In block 103, the user starts keyboard navigation of the user interface by, for example, pressing the TAB or SHIFT-TAB keys, to navigate to the first of the selectable elements in the default list of the user interface, i.e., the list of all of the selectable elements in the user interface. In block 104, it is determined whether the user wishes to add the current selectable element to the custom list that is being created or edited, or whether the user wishes to remove the current selectable element from the custom list if the current selectable element is already in the custom list that is being created or edited. The determination may be made based on, for example, a predefined keystroke or shortcut input from the user. Alternate methods for adding or removing elements may be used in various embodiments, i.e. mouse or voice. If it is determined in block 104 that the user wishes to perform an add or remove operation with respect to the current selectable element in the user interface, then, in block 105, the current selectable element is either added to or removed from the custom list, and then flow proceeds to block 106.

If the user does not choose to add/remove the current selectable element in block 104, flow also proceeds to block 106. In block 106, it is determined whether the customization is completed. This determination may be made based on whether current element is a last element in the default list of the user interface, or may be made based on user input, i.e., the user may also stop customization at any time before proceeding to the last element in the default list, or may proceed through the default list more than once. If it is determined in block 106 that customization is not completed, flow proceeds from block 106 to block 107, the next element in the default list of the user interface becomes the current element, and blocks 104/106 and, in some cases, block 105, are repeated for the new current element.

Blocks 104, 106, and 107, and, in some cases, block 105, are repeated as described above for each element in the default tab list until it is determined in block 106 that customization is completed, at which point flow proceeds from block 106 to block 108. In block 108, an order is set for the elements that are in the custom list. In some embodiments, the elements may be in the order in which they were added to the custom list; in other embodiments, the user may specify a different order. Then, in block 109, it is determined whether a name is required for the custom list. A name may be required for the custom list in block 109 if a user has recorded multiple custom lists for a single user interface. If it is determined in block 109 that the custom list requires a name, a name is either set by the user in block 110, or a default name is provided. The default name may comprise an identifier of the user interface (e.g., a URL or application, and date). Flow then proceeds from block 110 to block 111. If it is determined in block 109 that the custom list does require a name, or that the custom list already has a name (i.e., an existing custom list was selected for editing in block 102) flow proceeds to block 111. In block 111, the custom list is saved under a user profile of the user, and method 100 ends.

Figure 2:
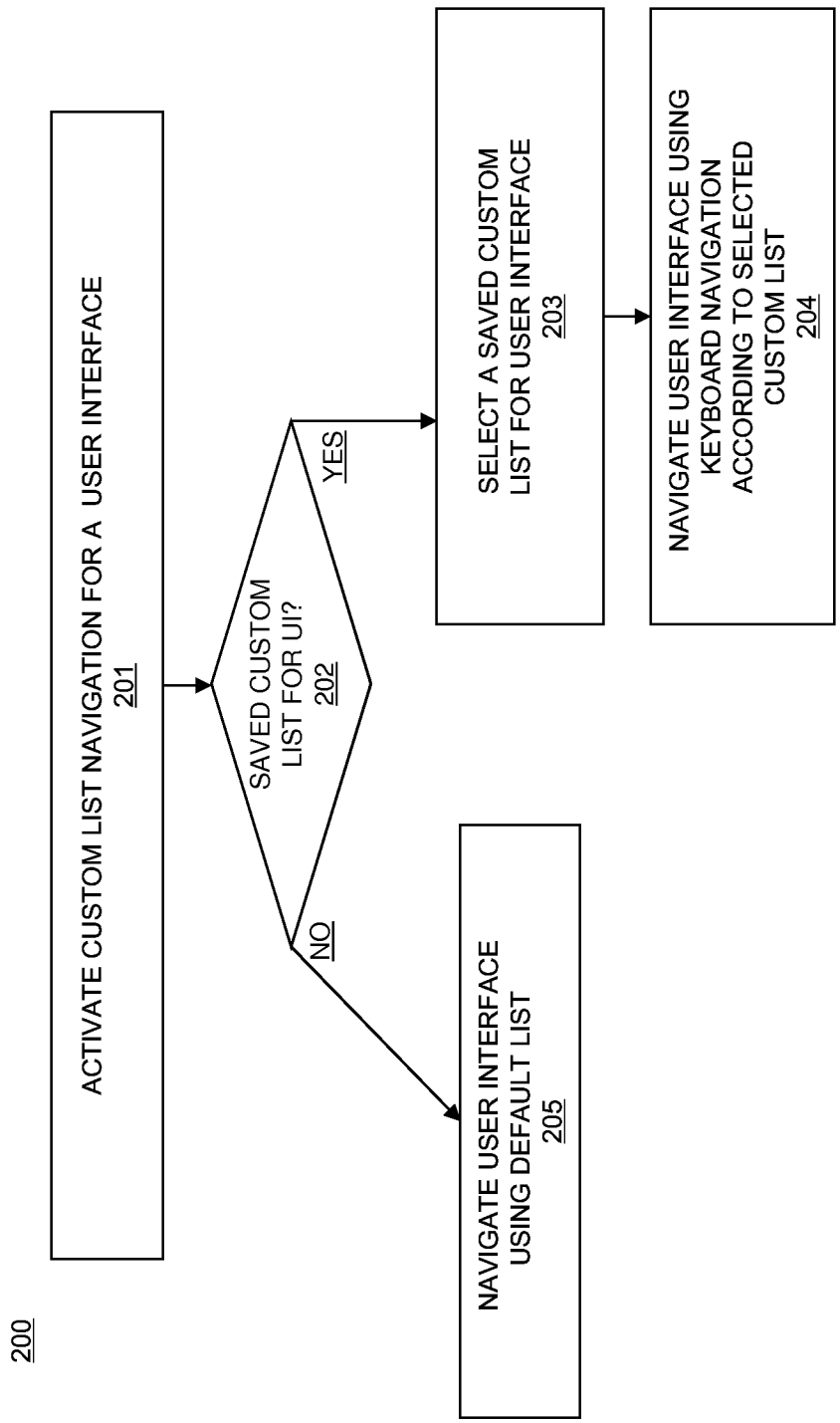
FIG. 2 depicts a flowchart of a method for using a custom lists for keyboard navigation of a user interface in accordance with an embodiment.

FIG. 2 illustrates an embodiment of a method 200 for using a saved custom list. In block 201, the user activates custom keyboard navigation by opening a user interface (for example, an application or web page) and selecting a selectable interface element of the user interface. Then, in block 202, it is determined whether one or more custom lists are saved under the user's profile for the particular user interface. If it is determined in block 202 that one or more custom lists exist for the user's profile for the user interface, then, in block 203, a saved custom list is selected. If multiple custom lists exist for the user interface, the user may be prompted to select one. If only a single custom list exists for the user interface, the single custom list is selected in block 203. Then, in block 204, the user interface is navigated using keyboard navigation according to the custom list. In block 204, the keyboard navigation proceeds through only the selected elements in the user interface that are in the custom list, in the order that is specified by the custom list. If it was determined in block 202 that no custom list exists for the user interface, then flow proceeds from block 202 to block 205, and the keyboard navigation of the user interface is performed according to the default list comprising all of the selectable elements of the user interface.

Figure 3:
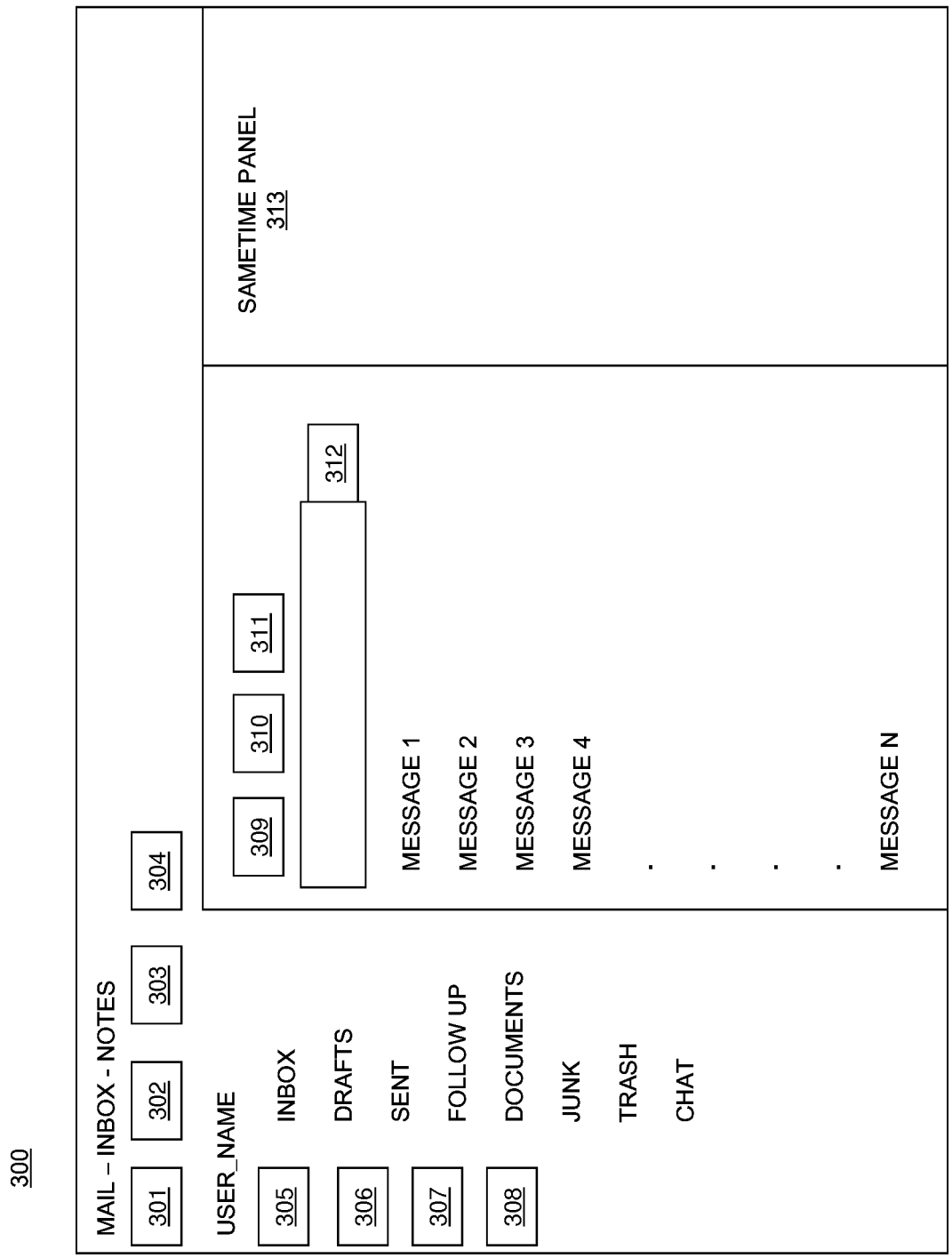
FIG. 3 depicts an example of a user interface for navigation using a custom list in accordance with an embodiment.

FIG. 3 illustrates an example of a user interface 300 that may be navigated using a custom list. The user interface 300 is an International Business Machines (IBM) Notes™ application user interface. The user interface 300 includes a plurality of selectable elements 301-313. Each of the selectable elements 301-313 are included in the default TAB list of the user interface 300, i.e., if a user navigates the user interface 300 according to the default TAB list, the user will cycle through all of the selectable elements 301-313. A user may create a custom list of any subset of selectable elements 301-313, in any desired order, for user interface 300 using method 100 of FIG. 1. An example custom list for user interface 300 is shown in Table 1 that includes workspace button 303, new message button 309, mailbox button 305, calendar button 306, and SameTime™ panel 313. Therefore, a user that uses keyboard navigation to navigate user interface 300 according to the default list would proceed through all of elements 301-313, while a user that uses keyboard navigation in user interface 300 according to the custom list of Table 1 would only proceed through elements 303, 309, 305, 306, and 313.

TABLE 1

Example Custom list

| Custom List Index | Object | Properties |
|---|---|---|
| 1 | Mailbox button | Class, class index, name, etc. |
| 2 | Calendar button | Class, class index, name, etc. |
| 3 | Workspace button | Class, class index, name, etc. |
| 4 | New message button | Class, class index, name, etc. |
| 5 | Sametime panel | Class, class index, name, etc. |

The Custom List Index field in the custom list specifies the order of a selectable element in the custom list, and may be set for each element in block 108 of FIG. 1. The Object field stores a name of the selectable element. The properties field stores various element properties of the selectable element that are specified in the source code of the user interface, for example a class, class index, and/or name. The object name and properties are used to identify the selectable elements that are in the custom list when navigating the user interface.

Figure 4:
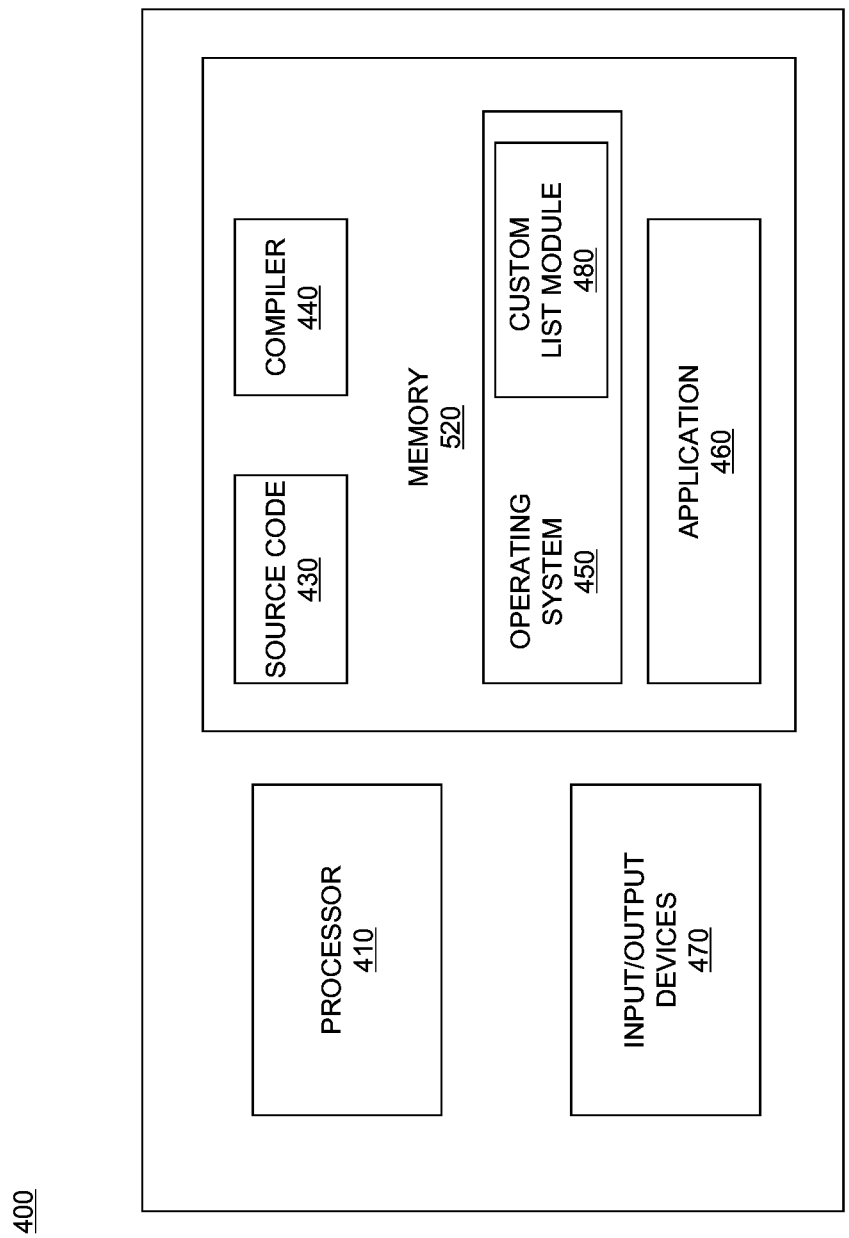
FIG. 4 depicts a computer for use in conjunction with custom lists for keyboard navigation of a user interface in accordance with an embodiment.

FIG. 4 illustrates an example of a computer 400 which may implement various embodiments of keyboard navigation of a user interface using custom lists. Various operations discussed above may utilize the capabilities of the computer 400. One or more of the capabilities of the computer 400 may be incorporated in any element, module, application, and/or component discussed herein. For example, a custom list module 480 that implements embodiments of keyboard navigation using custom lists may be integrated into accessibility software that is part of the operating system 450, and may be used to navigate any user interface that is displayed to a user corresponding to any application, such as application 430, that is run by the computer 400.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include increased efficiency of keyboard navigation in a user interface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for keyboard navigation of a user interface using a custom list, the method comprising:
displaying a user interface having selectable elements associated with a default list comprising default list identifiers corresponding to all of the selectable elements in the user interface;
determining whether a custom list for the user interface exists, wherein the custom list comprises a subset array having custom list identifiers that correspond to less than all of the default list identifiers, the subset array having an index number indicating an order of the selectable elements that correspond to the custom list identifiers;
based on determining that the custom list for the user interface exists, navigating the user interface according to the custom list;
based on determining that the custom list for the user interface does not exist, creating the custom list for the user interface by:
performing keyboard navigation of the user interface in response to receiving a first keyboard input from the user such that each selectable element in the default list is navigated to one at a time in an order that is described by the default list each time the first keyboard input is received; and
while performing the keyboard navigation:
upon navigating to a current selectable element of the selectable elements in response to receiving the first keyboard input, determining in response to receiving a second keyboard input from the user while at the current selectable element, whether to add the current selectable element to the custom list, wherein the second keyboard input is different from the first keyboard input;
based on determining from the received second keyboard input that the current selectable element should be added to the custom list, adding the current selectable element to the custom list; and
if a next selectable element exists in the default list, navigating to the next selectable element in the order described by the default list in response to the first keyboard input.

2. The method of claim 1, wherein performing keyboard navigation of the user interface according to the subset array comprises stepping through the subset array to navigate the selectable elements that correspond in the order.

3. The method of claim 1, wherein the order of the subset array corresponds to how the custom list identifiers were added to the custom list.

4. The method of claim 1, wherein a plurality of custom lists are associated with a profile of the user in a memory of a computer system, each of the plurality of custom lists being associated with a different respective user interface.

5. The method of claim 4, wherein multiple of custom lists of the plurality of custom lists are associated with the user interface.

6. The method of claim 1 wherein the user interface comprises an application.

7. The method of claim 1, wherein the user interface comprises a web page.

8. A computer program product for implementing keyboard navigation of a user interface using a custom list, the computer program product comprising:
a computer readable storage medium; and
program instructions disposed on the computer readable storage medium readable by a processing circuit, the program instructions operable upon execution by the processing circuit to:
display a user interface having selectable elements associated with a default list comprising default list identifiers corresponding to all of the selectable elements in the user interface;
determine whether a custom list for the user interface exists, the custom list comprising a subset array having custom list identifiers that correspond to less than all of the default list identifiers, the subset array having an index number indicating an order of the selectable elements that correspond to the custom list identifiers; and
based on determining that the custom list for the user interface exists, navigate the user interface according to the custom list;
based on determining that the custom list for the user interface does not exist, create the custom list for the user interface by:
performing keyboard navigation of the user interface in response to receiving a first keyboard input from the user such that each selectable element in the default list is navigated to one at a time in an order that is described by the default list each time the first keyboard input is received; and
while performing the keyboard navigation:
upon navigating to a current selectable element of the selectable elements in response to receiving a first keyboard input, determining in response to receiving a second keyboard input from the user while at the current selectable element, whether to add the current selectable element to the custom list, wherein the second keyboard input is different from the first keyboard input;
based on determining from the received second keyboard input that the current selectable element should be added to the custom list, adding the current selectable element to the custom list; and
if a next selectable element exists in the default list, navigating to the next selectable element in the order described by the default list in response to the first keyboard input.

9. The computer program product of claim 8, wherein the program instructions are further operable upon execution by the processing circuit to enable the user to perform the keyboard navigation of the user interface according to the subset array, the keyboard navigation of the user interface according to the subset array comprises navigation through each of the selectable elements corresponding with the custom list identifiers.

10. The computer program product of claim 9, wherein the navigation through each of the selectable elements corresponding with the custom list identifiers is according to the order.

11. The computer program product of claim 8, wherein a plurality of custom lists are associated with a profile of the user in a memory of a computer system, each of the plurality of custom lists being associated with a different respective user interface.

12. The computer program product of claim 8, wherein multiple of custom lists of the plurality of custom lists are associated with a single user interface.

13. A computer system for keyboard navigation of a user interface using a custom list, the system comprising:
- a memory; and
- a processor, communicatively coupled to said memory, the computer system configured to perform a method comprising:
  - displaying, on a computer display device of a computer system, a user interface to a user having selectable elements associated with a default list comprising default list identifiers corresponding to all of the selectable elements in the user interface;
  - determining whether a custom list for the user interface exists, wherein the custom list comprises a subset array having custom list identifiers that correspond to less than all of the default list identifiers, the subset array having an index number indicating an order of the selectable elements that correspond to the custom list identifiers;
  - based on determining that the custom list for the user interface exists, performing keyboard navigation of the user interface according to the custom list; and
  - based on determining that no custom list for the user interface exists, creating, by the computer system, the custom list for the user interface by:
    - performing, by the computer system, keyboard navigation of the user interface in response to receiving a first keyboard input from the user such that each selectable element in the default list is navigated to one at a time in an order that is described by the default list each time the first keyboard input is received navigated; and
    - while performing the keyboard navigation:
      - upon navigating to a current selectable element of the selectable elements in response to receiving the first keyboard input, determining, by the computer system, in response to receiving a second keyboard input from the user while at the current selectable element, whether to add the current selectable element to the custom list, wherein the second keyboard input is different from the first keyboard input;
      - based on determining from the received second keyboard input that the current selectable element should be added to the custom list, adding the current selectable element to the custom list; and
      - if a next selectable element exists in the default list, navigating, by the computer system, to the next selectable element in the order described by the default list in response to the first keyboard input.

14. The system of claim 13, wherein performing keyboard navigation of the user interface according to the custom list comprises stepping through each of the subset of selectable elements in the custom list in an order described by the custom list based on keyboard input to the computer system from the user.

15. The system of claim 13, further comprising setting an order of the subset of elements in the custom list, wherein the subset of elements in the custom list are set in the order in which they were added to the custom list.

16. The system of claim 13, wherein a plurality of custom lists are associated with a profile of the user in a memory of the computer system, each of the plurality of custom lists being associated with a different respective user interface.

17. The system of claim 16, wherein multiple of custom lists of the plurality of custom lists are associated with a single user interface.

* * * * *